(12) United States Patent
Song et al.

(10) Patent No.: US 12,248,841 B2
(45) Date of Patent: Mar. 11, 2025

(54) ANTI-MISPLUG DETECTION MECHANISM FOR CODE SCANNERS, CODE SCANNING SYSTEM AND BATTERY PROCESSING SYSTEM

(71) Applicant: CONTEMPORARY AMPEREX TECHNOLOGY (HONG KONG) LIMITED, Hong Kong (CN)

(72) Inventors: Yunlong Song, Fujian (CN); Lei Song, Fujian (CN); Guangcheng Zhong, Fujian (CN); Shengyong Wu, Fujian (CN); Pulin Zhang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 1 day.

(21) Appl. No.: 18/388,869

(22) Filed: Nov. 13, 2023

(65) Prior Publication Data

US 2024/0152710 A1    May 9, 2024

Related U.S. Application Data

(63) Continuation of application No. PCT/CN2023/082494, filed on Mar. 20, 2023.

(30) Foreign Application Priority Data

Nov. 9, 2022 (CN) .......................... 202222990467.8

(51) Int. Cl.
    *G06K 7/10* (2006.01)
    *G06K 7/14* (2006.01)

(52) U.S. Cl.
    CPC ....... *G06K 7/10881* (2013.01); *G06K 7/1413* (2013.01)

(58) Field of Classification Search
    None
    See application file for complete search history.

(56) References Cited

U.S. PATENT DOCUMENTS

| | | | |
|---|---|---|---|
| 2006/0091218 A1 | 5/2006 | DiCristina et al. | |
| 2011/0039444 A1 | 2/2011 | Wu et al. | |
| 2019/0036274 A1 | 1/2019 | Goodson, II et al. | |

FOREIGN PATENT DOCUMENTS

| | | |
|---|---|---|
| CN | 2917005 Y | 6/2007 |
| CN | 207623990 U | 7/2018 |

(Continued)

OTHER PUBLICATIONS

Machine translation of CN 212515820 retrieved Jun. 29, 2024 (Year: 2024).*

(Continued)

*Primary Examiner* — Suezu Ellis
(74) *Attorney, Agent, or Firm* — XSENSUS LLP

(57) ABSTRACT

An anti-misplug detection mechanism may include: a plurality of first communication interfaces, and anti-misplug detection assemblies. The plurality of first communication interfaces may be used to be mutually plug-in connected to second communication interfaces on the code scanners one to one to form a plurality of code scanner plug-in assembly groups; and the anti-misplug detection assemblies may be arranged in groups with the first communication interfaces, and include a first matching structure, a second matching structure and a detector. The first matching structures and the first communication interfaces may be relatively fixed one to one, the second matching structures may be connected to the code scanners one to one through connecting elements, and a first mistake-proofing feature and a second mistake-proofing feature of the same group may be matched with each other.

13 Claims, 3 Drawing Sheets

(56) References Cited

FOREIGN PATENT DOCUMENTS

| | | | |
|---|---|---|---|
| CN | 112040761 A | | 12/2020 |
| CN | 212515820 U | * | 2/2021 |
| CN | 113871969 A | | 12/2021 |
| CN | 217008217 U | | 7/2022 |

OTHER PUBLICATIONS

International Search Report mailed on Jul. 10, 2023, received for PCT Application PCT/CN2023/082494, filed on Mar. 20, 2023, 5 pages including English Translation.
Extended European Search Report issued Jul. 12, 2024 in European Patent Application No. 23801651.3.

* cited by examiner

ANTI-MISPLUG DETECTION MECHANISM FOR CODE SCANNERS, CODE SCANNING SYSTEM AND BATTERY PROCESSING SYSTEM

CROSS-REFERENCE TO RELATED APPLICATIONS

The present application is a continuation of International Application No. PCT/CN2023/082494, filed Mar. 20, 2023, which claims priority to the Chinese patent application No. 202222990467.8 filed to the China Patent Office on Nov. 9, 2022 and entitled "Anti-Misplug Detection Mechanism for Code Scanners, Code Scanning System and Battery Processing System", each of which is incorporated herein by reference in its entirety.

TECHNICAL FIELD

The present application relates to the technical field of mechanical structure locking, in particular to an anti-misplug detection mechanism for code scanners, a code scanning system and a battery processing system.

BACKGROUND

In various procedures related to a clean room in a battery production process, as an important information acquisition tool for uploading product information to a manufacturing execution system, a code scanner is widely applied to a feed-in and feed-out data acquisition process of each machine, and the accuracy of product serial number data is directly related to the traceability of a product and the reliability of the product quality.

In actual use, signal transmission lines of a plurality of code scanners are easily confused and misplugged, which may lead to inconsistence between product serial numbers obtained by the code scanners and actual battery cells, causing a manufacturing execution system to be unable to trace products correctly, thus resulting in huge product quality risks. Therefore, it is very necessary and urgent to take mistake-proofing measures for the communication lines of the code scanners.

SUMMARY OF THE DISCLOSURE

The present application at least provides an anti-misplug detection mechanism for code scanners, a code scanning system and a battery processing system.

The present application provides an anti-misplug detection mechanism for code scanners, including: a plurality of first communication interfaces and anti-misplug detection assemblies. The first communication interfaces are used to be plugged and connected to second communication interfaces on code scanners one to one, to form a plurality of code scanner plug-in assembly groups; the anti-misplug detection assemblies are arranged in groups with the first communication interfaces, and each anti-misplug detection assembly includes a first matching member or structure, a second matching member or structure and a detection member or detector, where the first matching members and the first communication interfaces are relatively fixed one to one, the second matching members are connected to the code scanners one to one through connecting elements, each first matching member has a first mistake-proofing feature, and each second matching member has a second mistake-proofing feature; the first mistake-proofing feature and the second mistake-proofing feature in the same code scanner plug-in assembly group are matched with each other, so that the first matching member and the second matching member in the same code scanner plug-in assembly group can be connected to each other in place, and the detection member is used to generate a trigger signal after the first matching member and the second matching member are connected in place. In the above solution, through the arrangement of the anti-misplug detection assemblies, the arrangement of the anti-misplug detection assemblies and the first communication interfaces in groups, and the second matching members being connected to the second communication interfaces, and through mutual matching of the mistake-proofing features of the first matching member and the second matching member, the first matching member and the second matching member in the same code scanner plug-in assembly group can be connected to each other, so that it can be determined that the code scanner has no misplug risk through the trigger signal generated by the detection member.

In some embodiments, the anti-misplug detection mechanism further includes a controller connected to the detection member. In the above solution, through the arrangement of the controller connected to the detection member, the controller can use the trigger signal generated by the detection member conveniently to execute corresponding operations.

In some embodiments, in the code scanner plug-in assembly group, a first distance is provided between a butting position of the first communication interface for butting against the second communication interface and a butting position of the first matching member for butting against the second matching member; and among the different code scanner plug-in assembly groups, a second distance is provided between the butting position of the first communication interface for butting against the second communication interface and the butting position of the first matching member for butting against the second matching member, where the first distance is less than the second distance. In the above solution, by controlling the first distance to be less than the second distance, misplug of the code scanner is prevented from the aspect of physical distances.

In some embodiments, under the connection of the connecting element, a maximum distance is provided between a butting position of the second communication interface for butting against the first communication interface and a butting position of the second matching member for butting against the first matching member, the maximum distance being greater than or equal to the first distance, and less than the second distance. In the above solution, by controlling the length of the connecting element, the misplug of the code scanner can be prevented from the aspect of physical distances.

In some embodiments, the first matching member and the second matching member are in plug-in cooperation with each other, one of the first mistake-proofing feature and the second mistake-proofing feature is a bump, and the other of the first mistake-proofing feature and the second mistake-proofing feature is a groove, where the bump in the same group can be inserted into the groove along with the plug-in cooperation between the first matching member and the second matching member, so that the first matching member and the second matching member in the same group can be connected to each other in place in a plug-in manner. In the above solution, whether the first matching member and the second matching member are matched can be determined by detecting the cooperation between the bump and the groove.

In some embodiments, one of the first matching member and the second matching member is a bolt, and the other of the first matching member and the second matching member is provided with a slot, where the bolt and the slot are in plug-in cooperation with each other, one of the bump and the groove is disposed on the wall of the slot, and the other of the bump and the groove is disposed on the peripheral wall of the bolt. In the above solution, the possibility of preventing misplug can be further improved by disposing the bump on one of the bolt and the slot.

In some embodiments, the first matching member is provided with a slot, the second matching member is a bolt, where the bolt and the slot are in plug-in cooperation with each other, the first matching member is further provided with an accommodating cavity in communication with the slot, and the detection member is at least partially disposed in the accommodating cavity. In the above solution, it is convenient to detect the cooperation between the slot and the bolt by at least partially disposing the detection member in the accommodating cavity in communication with the slot.

In some embodiments, the accommodating cavity is in communication with the slot along a plug-in direction of the bolt and the slot, and a cross section of the accommodating cavity perpendicular to the plug-in direction is less than a cross section of the slot perpendicular to the plug-in direction; the anti-misplug detection assembly further includes a trigger disposed on the bolt, and the trigger is configured to be inserted into the accommodating cavity when the bolt is inserted into the slot, and trigger the detection member. In the above solution, the cross section of the accommodating cavity perpendicular to the plug-in direction is less than the cross section of the slot perpendicular to the plug-in direction, so that the size of the slot can be reduced, and therefore, the size of the anti-misplug detection mechanism is reduced.

In some embodiments, the anti-misplug detection assembly further includes an indicator, the indicator being disposed adjacent to the first matching member of the same group, and used to form an in-place indication in response to the trigger signal of the detection member of the same group. In the above solution, it is convenient for a user to observe whether the code scanner is misplugged through the arrangement of the indicator.

In some embodiments, the first matching member is a slot made of polyformaldehyde, and the second matching member is a bolt made of polyformaldehyde. In the above solution, hidden dangers of metal particles in a production process can be eliminated through the matching between the slot and the bolt made of polyformaldehyde.

The present application provides a code scanning system, including code scanners and the above anti-misplug detection mechanism.

The present application provides a battery processing system, including the above code scanning system and a central control system, the code scanning system being used to scan barcodes on battery cells, and transmit code scanning results to the central control system.

In the above solutions, through the arrangement of the anti-misplug detection assemblies, the arrangement of the anti-misplug detection assemblies and the first communication interfaces in groups, and the second matching members being connected to the second communication interfaces, and through mutual matching of the mistake-proofing features of the first matching member and the second matching member, the first matching member and the second matching member in the same code scanner plug-in assembly group can be connected to each other, so that it can be determined that whether the second communication interface of the code scanner is plugged into the corresponding first communication interface through the trigger signal generated by the detection member.

It should be understood that both above general description and following detailed description are exemplary and explanatory only and are not intended to limit the present application.

DESCRIPTION OF DRAWINGS

Accompanying drawings here, which are incorporated in and constitute a part of this specification, illustrate embodiments consistent with the present application and, together with the description, serve to describe the technical solutions of the present application.

Figure 1:
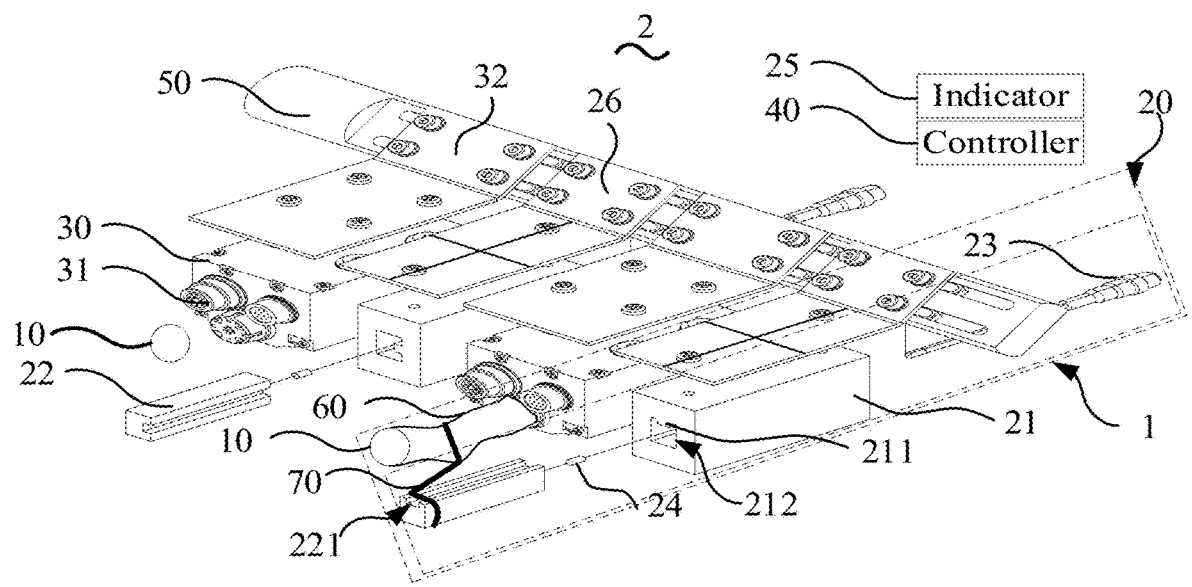
FIG. 1 is a first schematic diagram of the cooperation between code scanners and an anti-misplug detection mechanism in a code scanning system according to the present application.

DESCRIPTION OF REFERENCE NUMERALS anti-misplug detection mechanism 1, first communication interface 10, anti-misplug detection assembly 20, code scanner 30, second communication interface 31, first matching member 21, second matching member 22, detection member 23, first mistake-proofing feature 211, second mistake-proofing feature 221, mounting groove 222, slot 212, accommodating cavity 213, controller 40, trigger 24, indicator 25, first mounting bracket 32, second mounting bracket 26, main mounting shaft 50, code scanning system 2, battery processing system 100, connecting element 70, communication cable 60, and central control system 3.

DETAILED DESCRIPTION

Solutions of embodiments of the present application will be described in detail below in conjunction with the accompanying drawings.

In the following description, for purposes of illustration rather than limitation, specific details, such as specific system architectures, interfaces, and techniques, are set forth in order to thoroughly understand the present application.

In the present application, the term "and/or" is merely an association relationship for describing associated objects, and indicates that three relationships may exist. For example, A and/or B may indicate that A exists separately, both A and B exist, and B exists separately. In addition, the character "l" herein generally means that front and rear associated objects are in an "or" relationship. In addition, "a plurality of" herein means two or more than two. In addition, the term "at least one" herein means any one or any combination of at least two of a variety, for example, including at least one of A, B, and C may mean including any one or more elements selected from the set of A, B and C.

Signal transmission lines of a plurality of code scanners are easily confused and misplugged, which may lead to inconsistence between product serial numbers obtained by the code scanners and actual battery cells, causing a manufacturing execution system to be unable to trace products correctly, thus resulting in huge product quality risks. Therefore, it is very necessary and urgent to take mistake-proofing measures for the communication lines of the code scanners. For this reason, the inventors of the present application obtain the solutions of the present application by considering research on misplug prevention physically.

As shown in FIG. 1, an anti-misplug detection mechanism 1 for code scanners 30 includes a plurality of first communication interfaces 10 and anti-misplug detection assemblies 20. The plurality of first communication interfaces 10 are used to be mutually plugged and connected to second communication interfaces 31 on the code scanners 30 to form a plurality of code scanner plug-in assembly groups. The anti-misplug detection assemblies 20 are arranged in groups with the first communication interfaces 10, and each anti-misplug detection assembly includes a first matching member 21, a second matching member 22 and a detection member 23. The first matching members 21 and the first communication interfaces 10 are relatively fixed one to one, and the second matching members 22 are connected to the code scanners 30 one to one through connecting elements 70. The first matching member 21 has a first mistake-proofing feature 211, the second matching member 22 has a second mistake-proofing feature 221, and the first mistake-proofing feature 211 and the second mistake-proofing feature 221 in the same code scanner plug-in assembly group are matched with each other, so that the first matching member 21 and the second matching member 22 in the same code scanner plug-in assembly group can be connected to each other in place. The member 23 is used to generate a trigger signal after the first matching member 21 and the second matching member 22 are connected in place.

The plurality of first communication interfaces 10 may be two or more. Each first communication interface 10 corresponds to one second communication interface 31 on the code scanner 30. As shown in FIG. 1, FIG. 1 shows that the anti-misplug detection mechanism 1 includes two first communication interfaces and two code scanners 30. Certainly, in other embodiments, the anti-misplug detection mechanism 1 may include three or more first communication interfaces and code scanners, and the numbers of the first communication interfaces 10 and the code scanners 30 are not specified here.

The first communication interface 10 and the second communication interface 31 can be connected using a communication cable 60, so that the code scanner 30 can transmit scanned information to a central control system or other devices through the second communication interface 31, the communication cable 60 and the first communication interface 10. The connecting element 70 may be any device with a connection function. Exemplarily, the connecting element 70 may be a plastic steel strap, a cable tie, or the like. For example, the communication cable 60 may be connected to the second matching member 22 through the plastic steel strap. Exemplarily, one end of the plastic steel strap is bound to the communication cable 60, and the other end is bound to the second matching member 22 to realize the connection therebetween.

The arrangement of the anti-misplug detection assemblies 20 and the first communication interfaces 10 in groups means that each anti-misplug assembly corresponds to one first communication interface 10. Different anti-misplug detection assemblies 20 correspond to different first communication interfaces 10. In other words, each code scanner 30 corresponds to one first communication interface 10 and one anti-misplug detection assembly 20. The mistake-proofing features on the first matching member 21 and the second matching member 22 may be any matching features. Exemplarily, the mistake-proofing features may be threaded nut matching features, other plug-in matching features, or the like. The detection member 23 can be used to detect whether the first matching member 21 and the second matching member 22 are connected in place, and generate a trigger signal after detecting that the first matching member 21 and the second matching member 22 are connected in place. According to the trigger signal, a user can determine that the first matching member 21 and the second matching member 22 are connected in place, so as to confirm that the code scanner 30 has no misplug risk.

In the above solution, through the arrangement of the anti-misplug detection assemblies 20, the arrangement of the anti-misplug detection assemblies 20 and the first communication interface 10 in groups, and the second matching members 22 being connected to the second communication interfaces 31, and through mutual matching of the mistake-proofing features of the first matching member 21 and the second matching member 22, the first matching member 21 and the second matching member 22 in the same code scanner plug-in assembly group can be connected to each other, so that it can be determined that the code scanner 30 has no misplug risk through the trigger signal generated by the detection member 23.

In some embodiments, the anti-misplug detection mechanism 1 further includes a controller 40 connected to the detection member 23.

In the above solution, through the arrangement of the controller 40 connected to the detection member 23, the controller 40 can use the trigger signal generated by the detection member 23 conveniently to execute corresponding operations.

In some application scenarios, the controller 40 is used to enable a code scanning function of the code scanner 30 connected to the first communication interface 10 in the same code scanner plug-in assembly group, in response to the trigger signal generated by the detection member 23. And/or disable the code scanning function of the code scanner 30 in the same code scanner plug-in assembly group and/or generate an alarm signal, in response to the condition that the first communication interface 10 is connected to the code scanner 30 but the detection member 23 in the group does not generate the trigger signal.

Enabling the code scanning function of the code scanner 30 connected to the first communication interface 10 in the same group may act on the code scanner 30 or the central control system. Exemplarily, in the case of acting on the code scanner 30, the code scanning function of the code scanner 30 is controlled to be enabled, so that the code scanner 30 can perform a code scanning operation, thereby transmitting scanned information to the central control system; and in the case of acting on the central control system, information may be used according to a preset normal procedure after the central control system receives the information transmitted by the code scanner 30.

Disabling the code scanning function of the code scanner 30 may act on the code scanner 30 or the central control system. Exemplarily, in the case of acting on the code scanner 30, the code scanning function of the code scanner 30 is controlled to be disabled, so that the code scanner 30 cannot perform the code scanning operation, information acquired by the code scanner is prevented from being inconsistent with actual information, resulting in subsequent inability to trace a product correctly. In the case of acting on the central control system, disabling may be implemented any operation that can indicate that the information is not credible, such as discarding the information or marking the information, after the central control system receives the information transmitted by the code scanner 30.

The detection member 23 in the same group does not generate the trigger signal, which may be that no trigger signal is detected within a preset period of time after the connection between the first communication interface 10 and the second communication interface 31 is detected, or a mistake indication signal used to indicate that the first matching member 21 and the second matching member 22 are not connected in place is detected, and a trigger signal used to indicate that the first matching member 21 and the second matching member 22 are connected in place is not detected.

In the above solution, the detection member 23 generates the trigger signal, indicating that the code scanner 30 has no misplug risk, so that the code scanning function of the code scanner 30 connected to the first communication interface 10 in the same group can be controlled, and otherwise, the code scanning function of the code scanner 30 is disabled and/or the alarm signal is generated, the transmission of wrong scanned information is prevented or the user is facilitated to correct the connection between the second communication interface 31 and the corresponding first communication interface 10 in the group.

In some embodiments, in the code scanner plug-in assembly group, a first distance is provided between a butting position of the first communication interface 10 for butting against the second communication interface 31 and a butting position of the first matching member 21 for butting against the second matching member 22. Among the different code scanner plug-in assembly groups, a second distance is provided between the butting position of the first communication interface 10 for butting against the second communication interface 31 and the butting position of the first matching member 21 for butting against the second matching member 22, the first distance being less than the second distance.

The first communication interface 10 and the second communication interface 31 can be connected using the communication cable 60, and the butting position of the first communication interface 10 for butting against the second communication interface 31 may be a position on the communication cable 60 for connecting with the second matching member 22. The butting position of the first matching member 21 for butting against the second matching member 22 may be a position on the first matching member 21 for connecting with the second matching member 22.

Figure 2:
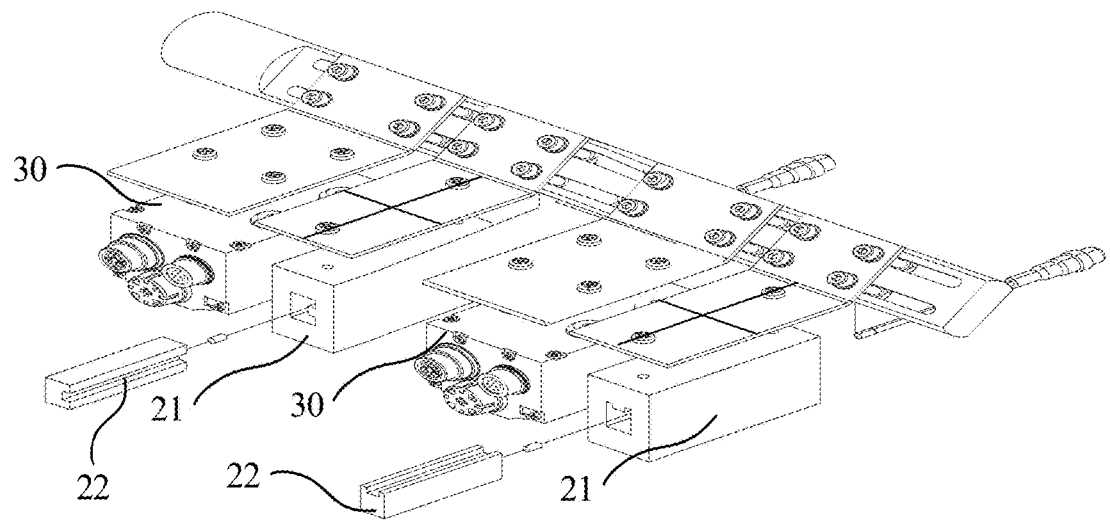
FIG. 2 is a second schematic diagram of the cooperation between the code scanners and the anti-misplug detection mechanism in the code scanning system according to the present application.

Please simultaneously refer to FIG. 2, the distance between the first code scanner 30 on the right and the first matching member 21 on the left is relatively long, and through physical observation, it can be determined that the first matching member 21 in the same group with the first code scanner 30 on the right is the first matching member 21 on the right, not the first matching member 21 on the left. In FIG. 2, the butting position of the first matching member 21 for butting against the second matching member 22 may be an end portion close to the second matching member 22.

The first distance may be the distance between the communication cable 60 and the first matching member 21 after the communication cable 60 is connected to the first communication interface 10 and the second communication interface 31. The second distance may be the distance between the butting positions of the first matching members 21 for butting against the second matching members 22 in the groups.

By setting the first distance to be less than the second distance, after being connected to the second communication interface 31, the second matching member 22 in the current group cannot be connected to the first matching member 21 in the other group, thus preventing misplug of the code scanner 30.

In the above solution, by controlling the first distance to be less than the second distance, the misplug of the code scanner 30 is prevented from the aspect of physical distances.

In some embodiments, under the connection of the connecting element 70, a maximum distance is provided between a butting position of the second communication interface 31 for butting against the first communication interface 10 and a butting position of the second matching member 22 for butting against the first matching member 21. The maximum distance is greater than or equal to the first distance and less than the second distance.

Optionally, the connecting element 70 is used to connect the communication cable 60 and the second matching member 22. The maximum distance refers to the distance between the connecting element 70 and the first matching member 21 after the connecting element 70 is connected to the communication cable 60, when the communication cable 60 is connected to the first communication interface 10 and the second communication interface 31. If the maximum distance is greater than or equal to the first distance, after the second matching member 22 in the same group is connected to the connecting element 70, the second matching member can be connected to the first matching member 21; if the maximum distance is less than the second distance, the second matching member in the same group 22 cannot be connected to the first matching member 21 in other group; and therefore, misplug of the code scanner 30 can be prevented by controlling the length of the connecting element 70.

In the above solution, by controlling the length of the connecting element 70, the misplug of the code scanner 30 can be prevented from the aspect of physical distances.

As shown in FIG. 1, in some embodiments, the first matching member 21 and the second matching member 22 are in plug-in cooperation with each other. One of the first mistake-proofing feature 211 and the second mistake-proofing feature 221 is a bump, and the other of the first mistake-proofing feature 211 and the second mistake-proofing feature 221 is a groove. The bump in the same group can be inserted into the groove along with the plug-in cooperation between the first matching member 21 and the second matching member 22, so that the first matching member 21 and the second matching member 22 in the same group can be connected to each other in place in a plug-in manner.

In some application scenarios, the first mistake-proofing feature 211 is a bump, and the second mistake-proofing feature 221 is a groove. In some application scenarios, the first mistake-proofing feature 211 is a groove, and the second mistake-proofing feature 221 is a bump. The shapes of the bumps and grooves can be set arbitrarily, and are not specifically limited here. The detection member 23 determines whether the first matching member 21 and the second matching member 22 are connected to each other in place by detecting the cooperation between the bump and the groove. The bump in the same group can be inserted into the groove along with the plug-in cooperation between the first matching member 21 and the second matching member 22. The shapes of the bumps and the grooves in the different groups can be different, so as to prevent misplug of the code scanners 30 caused by mixed plugging of the first matching members 21 and the second matching members 22 in the different groups from the aspect of physical shapes. In other words, through the diversified design of the grooves and bumps, fool-proofing requirements of the plurality of code scanners 30 are met.

In the above solution, whether the first matching member 21 and the second matching member 22 are matched can be determined by detecting the cooperation between the bump and the groove.

Figure 3:
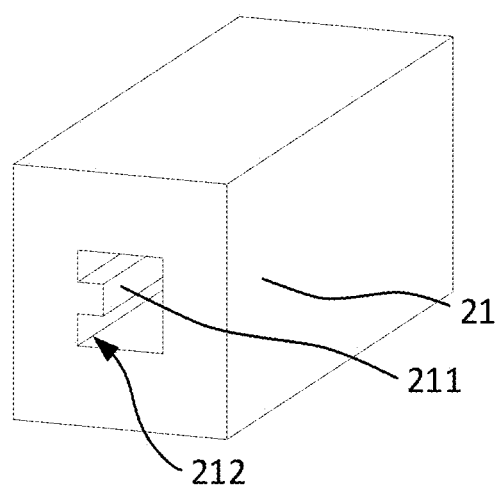
FIG. 3 is a first schematic structural diagram of a first matching member in FIG. 1.
Figure 4:
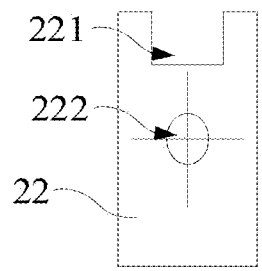
FIG. 4 is a first schematic structural diagram of a second matching member in FIG. 1.

Please simultaneously refer to FIG. 3 and FIG. 4. In some embodiments, one of the first matching member 21 and the second matching member 22 is a bolt, and the other of the first matching member 21 and the second matching member 22 is provided with a slot 212. The bolt and the slot 212 are in plug-in cooperation with each other, one of the bump and the groove is disposed on the wall of the slot 212, and the other of the bump and the groove is disposed on the peripheral wall of the bolt.

The bolt and the slot 212 can be of any shape. Exemplarily, the bolt and slot 212 are rectangular, oval and the like. Exemplarily, the slot 212 adopts a rectangular slot 212 in combination with the groove or bump, ensuring that the different bolts cannot be mixedly plugged. In some application scenarios, the first matching member 21 is the bolt, and the second matching member 22 is provided with the slot 212. In some application scenarios, the first matching member 21 is provided with the slot 212, and the second matching member 22 is the bolt. In this embodiment, the first matching member 21 being provided with the slot 212 and the second matching member 22 being the bolt are taken as an example. In some application scenarios, the bump is disposed on the wall of the slot 212, and the groove is formed in the peripheral wall of the bolt. In some application scenarios, the groove is formed in the wall of the slot 212, and the bump is disposed on the peripheral wall of the bolt.

In the above solution, the possibility of preventing misplug can be further improved by disposing the bump on one of the bolts and the slot 212.

Figure 5:
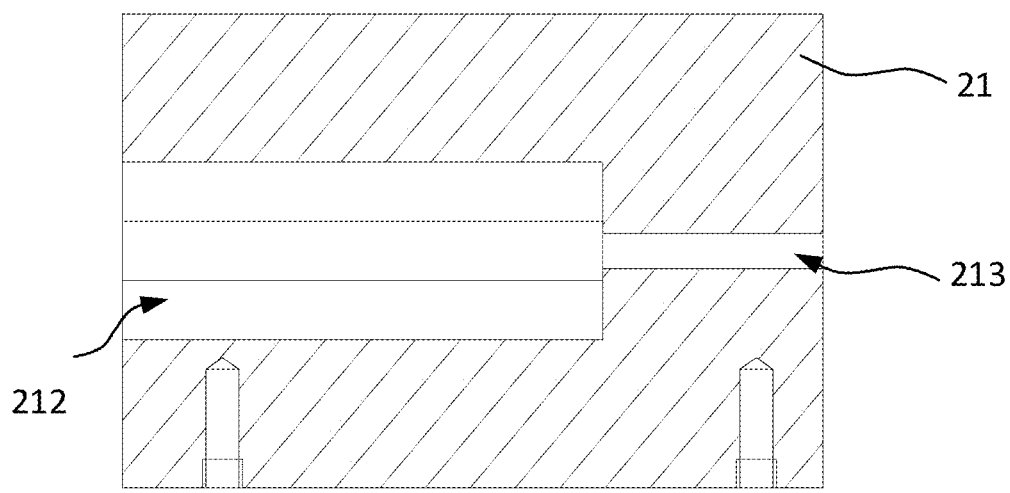
FIG. 5 is a second schematic structural diagram of the first electrical assembly in FIG. 1.

Please simultaneously refer to FIG. 5, in some embodiments, the first matching member 21 is provided with a slot 212, and the second matching member 22 is a bolt, where the bolt and the slot 212 are in plug-in cooperation with each other. The first matching member 21 is further provided with an accommodating cavity 213 in communication with the slot 212, and the detection member 23 is at least partially disposed in the accommodating cavity 213.

The detection member 23 may be a sensor. Exemplarily, the detection member 23 may be an in-place induction sensor, and in other embodiments, the detection member 23 may also be a distance sensor or the like. Whether the first matching member 21 and the second matching member 22 are connected in place is determined by detecting the positions of the second matching member 22 and the first matching member 21. A plug-in detection sensor is added to the slot 212, which can provide the possibility for electrical alarming and equipment linkage.

In the above solution, it is convenient to detect the cooperation between the slot 212 and the bolt by at least partially disposing the detection member 23 in the accommodating cavity 213 in communication with the slot 212.

Figure 6:
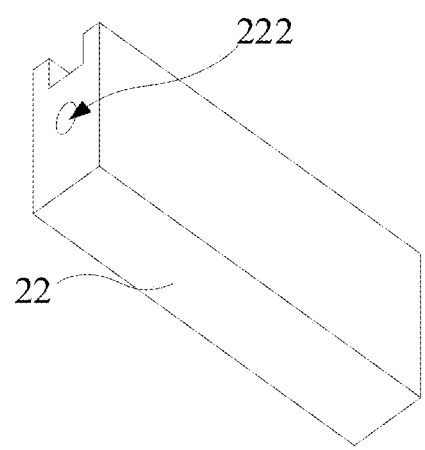
FIG. 6 is a second schematic structural diagram of the second matching member in FIG. 1.

Please simultaneously refer to FIG. 6. In some embodiments, the accommodating cavity 213 is in communication with the slot 212 along a plug-in direction of the bolt and the slot 212, and a cross section of the accommodating cavity 213 perpendicular to the plug-in direction is less than a cross section of the slot 212 perpendicular to the plug-in direction. The anti-misplug detection assembly 20 further includes a trigger 24 disposed on the plug. The trigger 24 is configured to be inserted into the accommodating cavity 213 when the bolt is inserted into the slot 212, and trigger the detection member 23.

As shown in FIG. 6, a mounting groove 222 may be formed in a second trigger 24 for mounting the trigger 24, and the position of the mounting groove 222 corresponds to the position of the accommodating cavity 213 so as to trigger the detection member 23. The trigger 24 may be a metal piece or other devices capable of performing signal transmission. The detection member 23 can determine whether the first matching member 21 and the second matching member 22 are connected in place by detecting the position of the trigger 24. In some application scenarios, the in-place induction sensor can choose a proximity switch with an extremely small diameter. The minimum diameter φ of a sensor probe is 3 mm, which can provide higher redundancy for the overall size of the slot 212 type anti-misplug detection mechanism 1, so that the overall size of the anti-misplug detection mechanism 1 can be miniaturized to adapt to parallel fool-proofing of the plurality of code scanners 30.

In the above solution, the cross section of the accommodating cavity 213 perpendicular to the plug-in direction is less than the cross section of the slot 212 perpendicular to the plug-in direction, so that the size of the slot 212 can be reduced, and therefore, the size of the anti-misplug detection mechanism 1 is reduced.

In some embodiments, the anti-misplug detection assembly 20 further includes an indicator 25. The indicator 25 is disposed adjacent to the first matching member 21 of the same group. And used to form an in-place indication in response to the trigger signal of the detection member 23 of the same group.

The indicator 25 may be an indicator light or an indicator light strip. The in-place indication may be lighting of the indicator light. Different colors of the indicator light are used to indicate the matching relationships between the first matching member 21 and the second matching member 22. For example, green is used to indicate that the first matching member 21 and the second matching member 22 are connected in place, and red indicates that the first matching member 21 and the second matching member 22 are not connected in place. The indicator 25 is selected from indicators with lights, which can not only meet the purpose of quickly determining the sensor status during troubleshooting, but also become a basis for determining the fool-proofing effect of visual inspection.

In the above solution, it is convenient for the user to observe whether the code scanner 30 is misplugged through the arrangement of the indicator 25.

In some embodiments, the code scanner 30 includes a plurality of second communication interfaces 31, and the different second communication interfaces 31 have different shapes. Through the diversified design of the second communication interfaces 31, the problem that in a battery production process, the code scanner 30 designed with a threaded locking type aviation plug cannot use a special-shaped plug fool-proofing measure of conventional plugs can be solved.

In some embodiment, the first matching member 21 is a slot made of polyformaldehyde, and the second matching member 22 is a bolt made of polyformaldehyde.

Polyformaldehyde (POM), also known as polyoxymethylene, belongs to plastics. Generally, a polymer obtained by formaldehyde polymerization has a low degree of polymerization and is easy to depolymerize by heat. The first matching member 21 and the second matching member 22 are made of polyformaldehyde, which solves the problem that in the battery production process, a conventional metal mechanism cannot eliminate hidden dangers of metal particles in the field of battery production.

In some embodiments, the anti-misplug detection mechanism 1 further includes a main mounting shaft 50. The code scanner 30 is mounted on the main mounting shaft 50 through a first mounting bracket 32, and the first matching member 21 is mounted on the main mounting shaft 50 through a second mounting bracket 26. If there are a plurality of code scanners 30 and anti-misplug detection mechanisms 1, the code scanners 30 and the anti-misplug detection mechanisms 1 may be disposed alternatively. The first mounting bracket 32 and the second mounting bracket 26 may be mounted on the main mounting shaft 50 through transferred fasteners (for example bolts, screws).

For a better understanding of the anti-misplug detection mechanism 1 for the code scanners 30 provided by the present application, please refer to the following application examples.

The anti-misplug detection structure provided in this application may be directly installed on the main mounting shaft 50 of the feed-in and feed-out code scanners 30 of each machine. After confirming that the communication cable 60 corresponding to the code scanner 30 is plugged in correctly, the closest configured bolt is selected, and the communication cable 60 is connected and fastened to the bolt with the plastic steel strap or cable tie. The length of the plastic steel strap or cable tie needs to be suitable, so that the bolt can be connected to the corresponding slot 212 in place, but cannot be inserted into the slot 212 of the adjacent group. After the communication cable 60 is connected and fastened to the bolt, the bolt is inserted into the corresponding slot 212, and after it is detected that the bolt and the slot 212 are connected in place, the indicator light is on. And it can be considered that the communication cable 60 of the code scanner 30 is not misplugged. If the indicator light is not on or the color of the indicator light is a color corresponding to misplug, the personnel can change the connection between the communication cable 60 and the first communication interface 10 through the color of the indicator light to play a role in preventing misplug.

In some embodiments, the controller 40 can also give a pop-up alarm on a visual interface and control the code scanner 30 or code scanning system 2 to shut down in response to the condition that the first communication interface 10 is connected to the code scanner 30, but the detection member 23 in the same group does not generate the trigger signal. Alarm information can also be generated and uploaded to a preset fault management system. The controller 40 may also clear the pop-up alarm on the visual interface and allow the code scanner 30 or code scanning system 2 that shuts down to start up, in response to detecting the trigger signal. The controller 40 may further stay in the alarm and end in respond to not detecting the trigger signal.

As shown in FIG. 6, a code scanning system 2 includes code scanners 30 and an anti-misplug detection mechanism 1 for the code scanners 30 according to the above anti-misplug detection mechanism 1 embodiment for the code scanners 30. The code scanners 30 are used to obtain and upload product information during a production process of articles such as batteries.

For the specific structure of the anti-misplug detection mechanism 1 for the code scanners 30, please refer to the above anti-misplug detection mechanism 1 embodiment for the code scanners 30, which will not be repeated here.

In the above solution, through the arrangement of the anti-misplug detection assemblies 20, the arrangement of the anti-misplug detection assemblies 20 and the first communication interfaces 10 in groups, and the second matching members 22 being connected to the second communication interfaces 31, and through mutual matching of the mistake-proofing features of the first matching member 21 and the second matching member 22, the first matching member 21 and the second matching member 22 in the same group can be connected to each other, so that it can be determined that the code scanner 30 has no misplug risk through the trigger signal generated by the detection member 23.

Figure 7:
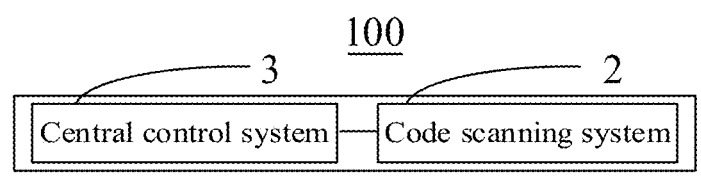
FIG. 7 is a schematic diagram of a frame of a battery processing system according to the present application.

As shown in FIG. 7, a battery processing system 100 may include the above code scanning system 2 and a central control system 3. The code scanning system 2 is used to scan barcodes on battery cells, and transmit code scanning results to the central control system 3.

The central control system 3 is used to store the code scanning results or perform other data processing operations.

In the above solution, through the arrangement of the anti-misplug detection assemblies 20, the arrangement of the anti-misplug detection assemblies 20 and the first communication interfaces 10 in groups, and the second matching members 22 being connected to the second communication interfaces 31, and through mutual matching of the mistake-proofing features of the first matching member 21 and the second matching member 22, the first matching member 21 and the second matching member 22 in the same group can be connected to each other, so that it can be determined that the code scanner 30 has no misplug risk through the trigger signal generated by the detection member 23.

The above descriptions of the various embodiments tend to emphasize the differences between the various embodiments, the same or similar points can be referred to each other, and for the sake of brevity, details are not repeated herein.

In several embodiments provided by the present application, it should be understood that, the disclosed method and apparatus may be implemented in other manners. For example, the apparatus embodiment described above is only illustrative. For example, the division of the modules or units is only a logical function division. In an actual implementation, there may be other division methods. For example, a plurality of units or assemblies may be combined or may be integrated into another system, or some features may be ignored, or not implemented. On the other hand, the shown or discussed mutual coupling or direct coupling or communication connection may be indirect coupling or communication connection through some interfaces, apparatuses, or units, and may be in electrical, mechanical, or in other forms

What is claimed is:

1. An anti-misplug detection mechanism for code scanners, comprising:

a plurality of first communication interfaces, configured to be mutually plug-in connected to second communication interfaces, which are disposed on the code scanners respectively, to form a plurality of code scanner plug-in assembly groups; and anti-misplug detection assemblies, arranged in groups with the first communication interfaces respectively, and each of the anti-misplug detection assemblies comprising a first matching structure, a second matching structure and a detector, wherein first matching structures and the first communication interfaces are relatively fixed one to one, second matching structures are connected to the code scanners one to one through connecting elements, the first matching structure has a first mistake-proofing feature, and the second matching structure has a second mistake-proofing feature; and the first mistake-proofing feature and the second mistake-proofing feature in a same code scanner plug-in assembly group of the plurality of code scanner plug-in assembly groups are matched with each other, so that the first matching structure and the second matching structure in the same code scanner plug-in assembly group are capable of being connected to each other in place, and the detector is configured to generate a trigger signal after the first matching structure and the second matching structure are connected in place.

2. The anti-misplug detection mechanism according to claim 1, wherein the anti-misplug detection mechanism further comprises a controller connected to the detector.

3. The anti-misplug detection mechanism according to claim 2, wherein the controller is configured to enable a code scanning function of the code scanner connected to the first communication interface in the same code scanner plug-in assembly group, in response to the trigger signal generated by the detector, and/or disable the code scanning function of the code scanner in the code scanner plug-in assembly group and/or generate an alarm signal, in response to a condition that the first communication interface is connected to the code scanner but the detector in the same group does not generate the trigger signal.

4. The anti-misplug detection mechanism according to claim 2, wherein in the same code scanner plug-in assembly group, a first distance is provided between a butting position of the first communication interface for butting against the second communication interface and a butting position of the first matching structure for butting against the second matching structure;

among different code scanner plug-in assembly groups of the plurality of code scanner plug-in assembly groups, a second distance is provided between the butting position of the first communication interface for butting against the second communication interface and the butting position of the first matching structure for butting against the second matching structure; and the first distance is less than the second distance.

5. The anti-misplug detection mechanism according to claim 4, wherein under connection of one of the connecting elements, a maximum distance is provided between a butting position of the second communication interface for butting against the first communication interface and a butting position of the second matching structure for butting against the first matching structure, the maximum distance being greater than or equal to the first distance, and less than the second distance.

6. The anti-misplug detection mechanism according to claim 1, wherein the first matching structure and the second matching structure are in plug-in cooperation with each other, one of the first mistake-proofing feature and the second mistake-proofing feature is a bump, and the other of the first mistake-proofing feature and the second mistake-proofing feature is a groove, wherein the bump in the same group is capable of inserting into the groove along with the plug-in cooperation between the first matching structure and the second matching structure, so that the first matching structure and the second matching structure in the same group is capable of connecting to each other in place in a plug-in manner.

7. The anti-misplug detection mechanism according to claim 6, wherein one of the first matching structure and the second matching structure is a bolt, and the other of the first matching structure and the second matching structure is provided with a slot, where the bolt and the slot are in plug-in cooperation with each other, one of the bump and the groove is disposed on a wall of the slot, and the other of the bump and the groove is disposed on a peripheral wall of the bolt.

8. The anti-misplug detection mechanism according to claim 1, wherein the first matching structure is provided with a slot, and the second matching structure is a bolt, wherein the bolt and the slot are in plug-in cooperation with each other, the first matching structure is further provided with an accommodating cavity in communication with the slot, and the detector is at least partially disposed in the accommodating cavity.

9. The anti-misplug detection mechanism according to claim 8, wherein the accommodating cavity is in communication with the slot along a plug-in direction of the bolt and the slot, and a cross section of the accommodating cavity perpendicular to the plug-in direction is less than a cross section of the slot perpendicular to the plug-in direction; and each of the anti-misplug detection assemblies further comprises a trigger disposed on the bolt, and the trigger is configured to be inserted into the accommodating cavity when the bolt is inserted into the slot, and trigger the detector.

10. The anti-misplug detection mechanism according to claim 1, wherein each of the anti-misplug detection assemblies further comprises an indicator, and the indicator is disposed adjacent to the first matching structure of the same group, and configured to form an in-place indication in response to the trigger signal of the detector of the same group.

11. The anti-misplug detection mechanism according to claim 1, wherein the first matching structure is a slot made of polyformaldehyde, and the second matching structure is a bolt made of polyformaldehyde.

12. A code scanning system, comprising the code scanners and the anti-misplug detection mechanism according to claim 1.

13. A battery processing system, comprising the code scanning system according to claim 12 and a central control system, the code scanning system being used to scan barcodes on battery cells, and transmitting code scanning results to the central control system.

* * * * *